US009129061B2

(12) United States Patent
Nixon et al.

(10) Patent No.: US 9,129,061 B2
(45) Date of Patent: Sep. 8, 2015

(54) METHOD AND APPARATUS FOR ON-CHIP DEBUGGING

(75) Inventors: Scott P. Nixon, Fort Collins, CO (US); Tiger Lu, Toronto (CA); Eric M. Rentschler, Windsor, CO (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 450 days.

(21) Appl. No.: 13/557,756

(22) Filed: Jul. 25, 2012

(65) Prior Publication Data

US 2014/0032801 A1 Jan. 30, 2014

(51) Int. Cl.
 *G06F 11/36* (2006.01)
(52) U.S. Cl.
 CPC .......... *G06F 11/364* (2013.01); *G06F 11/3648* (2013.01)
(58) Field of Classification Search
 CPC .................................................... G06F 11/364
 USPC ................................ 710/107; 714/30, 34, 35
 See application file for complete search history.

(56) References Cited

U.S. PATENT DOCUMENTS

| 5,483,518 | A | | 1/1996 | Whetsel |
|---|---|---|---|---|
| 5,771,240 | A | | 6/1998 | Tobin et al. |
| 5,951,696 | A | * | 9/1999 | Naaseh et al. ................... 714/34 |
| 6,308,282 | B1 | | 10/2001 | Huang et al. |
| 6,502,210 | B1 | | 12/2002 | Edwards |
| 6,751,751 | B1 | | 6/2004 | Murray et al. |
| 6,757,846 | B1 | * | 6/2004 | Murray et al. ................... 714/34 |
| 6,760,867 | B2 | * | 7/2004 | Floyd et al. ....................... 714/39 |
| 7,010,672 | B2 | * | 3/2006 | Ahmad et al. ................. 712/227 |
| 7,013,409 | B2 | | 3/2006 | Gergen et al. |
| 7,107,489 | B2 | | 9/2006 | Gergen et al. |
| 7,149,926 | B2 | | 12/2006 | Ahmad et al. |
| 7,613,955 | B2 | | 11/2009 | Arnold |
| 7,664,052 | B2 | | 2/2010 | Oku et al. |
| 7,770,073 | B2 | | 8/2010 | Fashchik et al. |
| 8,566,645 | B2 | * | 10/2013 | Rentschler et al. ............. 714/34 |
| 8,635,497 | B2 | * | 1/2014 | Miller et al. .................... 714/30 |
| 8,683,265 | B2 | | 3/2014 | Rentschler et al. |
| 8,825,922 | B2 | * | 9/2014 | Mayer et al. ..................... 710/22 |
| 2004/0250164 | A1 | | 12/2004 | Ahmad et al. |
| 2005/0034017 | A1 | | 2/2005 | Airaud et al. |
| 2006/0150023 | A1 | | 7/2006 | Hasebe et al. |
| 2006/0236189 | A1 | | 10/2006 | Kato et al. |
| 2007/0079288 | A1 | | 4/2007 | Willwerth et al. |
| 2009/0271553 | A1 | | 10/2009 | Gang et al. |

(Continued)

FOREIGN PATENT DOCUMENTS

EP 0638834 2/1995

OTHER PUBLICATIONS

International Search Report and Written Opinion correlating to PCT/US13/051779, dated Oct. 1, 2013, 9 pages.

*Primary Examiner* — Brian Misiura

(57) ABSTRACT

The present invention provides a method and apparatus for dynamically configuring debug triggering patterns. One example embodiment of the method includes comparing values of bits received on a first subset of a plurality of lines of a bus with a first pattern of bits and capturing values of bits received on a second subset of the plurality of lines of the bus in response to the comparison indicating that the values of the bits received on the first subset of the lines match the first pattern of bits. The exemplary embodiment of the method also includes defining a second pattern for triggering a debug action using the captured values.

22 Claims, 6 Drawing Sheets

(56) References Cited

U.S. PATENT DOCUMENTS

| | | |
|---|---|---|
| 2012/0144240 A1 | 6/2012 | Rentschler et al. ............. 714/34 |
| 2012/0185730 A1 | 7/2012 | Moran et al. |
| 2012/0233504 A1 | 9/2012 | Patil et al. |
| 2014/0122929 A1* | 5/2014 | Nixon et al. .................... 714/30 |

* cited by examiner

METHOD AND APPARATUS FOR ON-CHIP DEBUGGING

BACKGROUND

This application relates generally to processor-based systems, and, more particularly, to debugging in processor-based systems.

Conventional processor-based systems from personal computers to mainframes typically include a central processing unit (CPU) that is configured to access instructions or data that are stored in a main memory. Processor-based systems may also include other types of processors such as graphics processing units (GPUs), digital signal processors (DSPs), accelerated processing units (APUs), co-processors, or applications processors. Entities within the conventional processor-based system communicate by exchanging signals over buses or bridges such as a northbridge, a southbridge, a Peripheral Component Interconnect (PCI) Bus, a PCI-Express Bus, or an Accelerated Graphics Port (AGP) Bus.

Some or all of the processors, buses, or bridges in the processor-based system may be fabricated on an integrated circuit (IC) using a circuit design created by engineers, typically using automated design software. The design of an IC for a system, which may include multiple ICs, is typically verified using a suite of tests to ensure that the IC functions correctly. Testing of the IC during the design, development, fabrication, or operational stages is generally referred to as debugging the IC. With the evolution of processing technologies and reduction of size and increase in complexity of devices, debugging of circuit designs has become more and more difficult to perform using traditional simulation tools and techniques. For example, when an error is detected during debugging, designers may attempt to tap signals of interest from the circuit and use a logic analyzer to determine the cause of the error. However, this is a difficult process and is often not effective at least in part because errors that have already occurred are often difficult to repeat and reconstruct.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for dynamically configuring debug triggering patterns. One exemplary embodiment of the method includes comparing values of bits received on a first subset of a plurality of lines of a bus with a first pattern of bits and capturing values of bits received on a second subset of the plurality of lines of the bus in response to the comparison indicating that the values of the bits received on the first subset of the lines match the first pattern of bits. The exemplary embodiment of the method also includes defining a second pattern for triggering a debug action using the captured values.

In another embodiment, an apparatus is provided for dynamically configuring debug triggering patterns. One exemplary embodiment of the apparatus includes a first comparator configurable to compare values of bits received on a first subset of a plurality of lines of a bus with a first pattern of bits. The exemplary embodiment also includes logic configurable to capture values of bits received on a second subset of the plurality of lines of the bus in response to a signal from the first comparator indicating that the values of the bits received on the first subset of the lines match the first pattern of bits. The logic is further configurable to define a second pattern for triggering a debug action using the captured values.

In yet another embodiment, computer readable media including instructions are provided that when executed can configure a manufacturing process used to manufacture a semiconductor device including a first comparator configurable to compare values of bits received on a first subset of a plurality of lines of a bus with a first pattern of bits. The instructions when executed can also configure the manufacturing process to manufacture a semiconductor device including logic configurable to capture values of bits received on a second subset of the plurality of lines of the bus in response to a signal from the first comparator indicating that the values of the bits received on the first subset of the lines match the first pattern of bits. The logic is further configurable to define a second pattern for triggering a debug action using the captured values.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
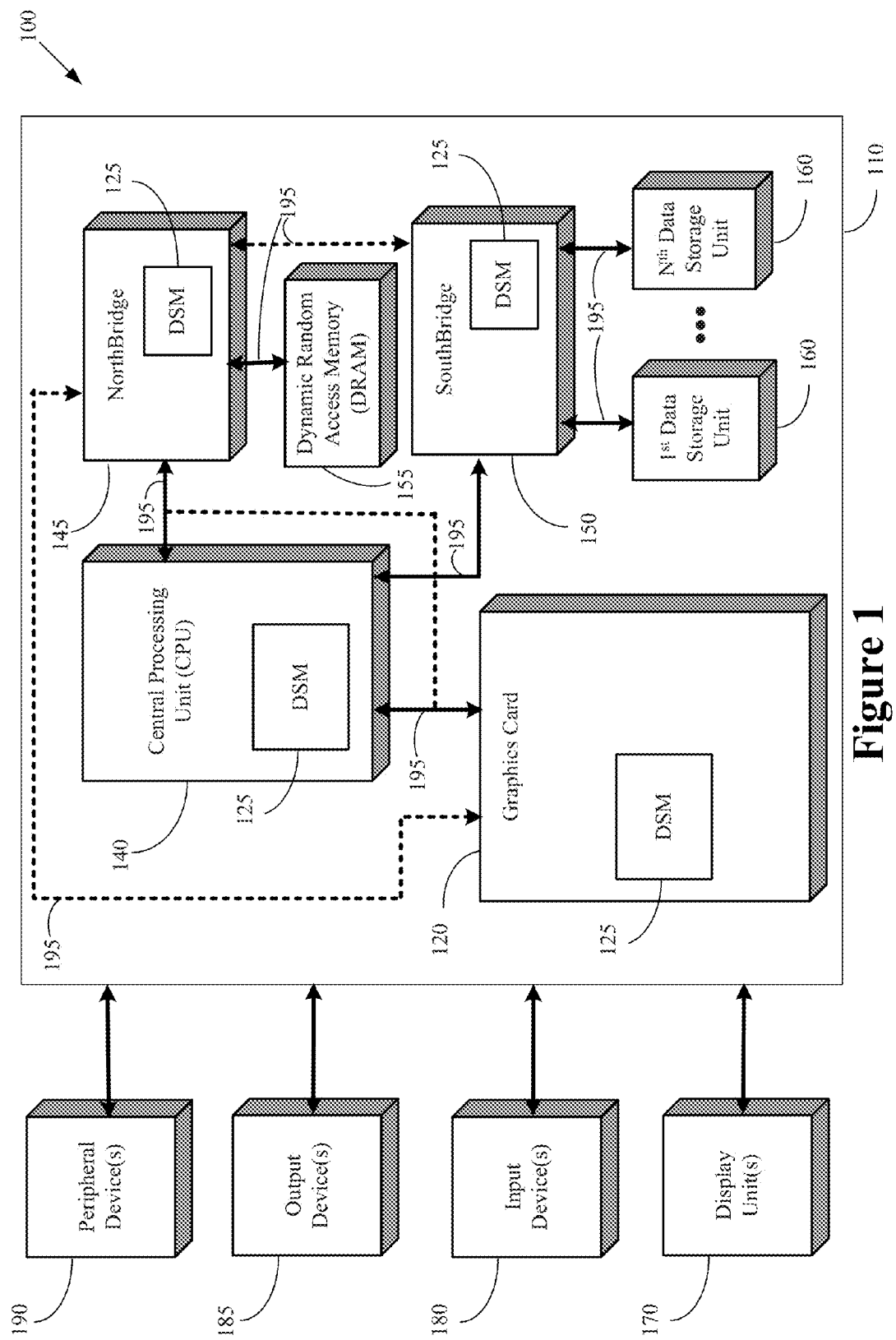
FIG. 1 conceptually illustrates a first exemplary embodiment of a processor-based system.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

Debugging logic implemented in silicon (such as a debug state machine) may monitor bits on a debug bus using one or more comparators. The debugging logic can trigger various actions when the bits on the debug bus match a predetermined or static pattern. The actions include, but are not limited to, stopping a clock, entering a debug mode, issuing a debug cross trigger, starting or stopping storage of information in a storage unit such as a register or memory, transitioning to or from a particular debug state, incrementing or clearing a counter, setting or clearing a flag in a register, or the like. However, there are many debugging scenarios in which the pattern that should be used to trigger an action changes unpredictably over time. Conventional debugging logic is not able to detect these situations by comparing static patterns to the data stream.

At least in part to address these drawbacks in the conventional approaches for providing debug triggers, embodiments of the debugging logic described herein may include one or more comparators that compare a subset of the bits on lines of a debug bus to a predetermined pattern. For example, the comparators may monitor the 4 command bits on a 32-bit debug bus and compare the command bits to a pattern that indicates that a dynamic pattern update should be performed. When the subset of bits on the debug bus matches the predetermined pattern, the debugging logic can trigger the capture of data on another subset of the bits on the debug bus. For example, when the four command bits on the 32-bit debug bus match the predetermined pattern, the 28 address bits corresponding to the matching command bits can be captured. The captured information can then be used to update or modify the matching pattern that another comparator uses to trigger another debugging action. In some embodiments, sets of comparators that trigger on different matching patterns may be interconnected so that the actions triggered by the comparators (or combinations of the comparators) include updating matching patterns used by other interconnected comparators. The debugging logic may be configured so that the captured data is aligned with the triggering data, e.g., by including delays to account for differences in the data path and the trigger-to-action path.

FIG. 1 conceptually illustrates a first exemplary embodiment of a processor-based system 100. In various embodiments, the processor-based system 100 may be a personal computer, a laptop computer, a handheld computer, a netbook computer, an ultrabook computer, a mobile device, a smart phone, a tablet, a telephone, a personal data assistant, a server, a mainframe, a work terminal, or the like. The illustrated embodiment of the computer system 100 includes a main structure 110 which may be a computer motherboard, system-on-a-chip, circuit board or printed circuit board, a desktop computer enclosure or tower, a laptop computer base, a server enclosure, part of a mobile device, tablet, personal data assistant, or the like. In one embodiment, the computer system 100 runs an operating system such as Linux, UNIX, Windows, Mac OS, or the like.

In the illustrated embodiment, the main structure 110 includes a graphics card 120. The graphics card 120 may also be connected on a Peripheral Component Interconnect (PCI) Bus (not shown), PCI-Express Bus (not shown), an Accelerated Graphics Port (AGP) Bus (also not shown), or other electronic or communicative connection. In various embodiments the graphics card 120 may be referred to as a circuit board or a printed circuit board or a daughter card or the like. For example, semiconductor devices used to form the graphics card 120 may be formed on a single substrate.

The computer system 100 shown in FIG. 1 also includes a central processing unit (CPU) 140, which is physically, electromagnetically, or communicatively coupled to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other electronic or communicative connection, as discussed herein. For example, CPU 140, northbridge 145, GPU 120 may be included in a single package or as part of a single die or "chips". In certain embodiments, the northbridge 145 may be coupled to a system RAM (or DRAM) 155 and in other embodiments the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the central processing unit 140, northbridge 145, southbridge 150, graphics processing unit 120, or DRAM 155 may be a computer chip or a silicon-based computer chip, or may be part of a computer chip or a silicon-based computer chip. The various components of the computer system 100 may be operatively, electromagnetically or physically connected or linked with a connection 195 or more than one connection 195. In the illustrated embodiment, the connections 195 include network connections such as 10/100/1000 Ethernet connections. However, persons of ordinary skill in the art having benefit of the present disclosure should appreciate that alternative embodiments may use different connections 195. For example, the connections 195 may be network connections that operate according to different speeds (e.g., speeds lower than 10 Gbe or higher than 1000 Gbe) and in some cases the connections 195 may also include other buses such as PCI or PCIe buses.

The computer system 100 may be connected to one or more display units 170, input devices 180, output devices 185, or peripheral devices 190. In various alternative embodiments, these elements may be internal or external to the computer system 100 and may be wired or wirelessly connected. The display units 170 may be internal or external monitors, television screens, handheld device displays, touch pads, touch-sensitive screens, and the like. The input devices 180 may be any one of a keyboard, mouse, track-ball, stylus, mouse pad, mouse button, joystick, touch-sensitive screen, scanner or the like. The output devices 185 may be any one of a monitor, printer, plotter, copier, or other output device. The peripheral devices 190 may be any other device that can be coupled to a computer. Exemplary peripheral devices 190 may include a CD/DVD drive capable of reading or writing to physical digital media, a USB device, Zip Drive, external floppy drive, external hard drive, thumb drive, phone or broadband modem, router/gateway, access point or the like.

One or more debugging state machines (DSM) 125 may be implemented in the processor-based system 100 and may be used to debug operations performed by the system 100 or entities within the system 100. In the illustrated embodiment, embodiments of the DSM 125 may be implemented in the graphics card 120, central processing unit 140, northbridge 145, southbridge 150, or elsewhere within the system 100. As discussed herein, embodiments of the DSM 125 may be physically, electromagnetically, or communicatively coupled to a bus (not shown in FIG. 1) that may be used to convey signals related to debugging such as debugging triggers or actions. Embodiment of the bus may be used to exchange signals between different embodiments of the DSM 125 or other entities within the system 100 or entities that are physically, electromagnetically, or communicatively coupled to the system 100, e.g., to support triggering, cross-triggering, capture, or other operations.

Figure 2:
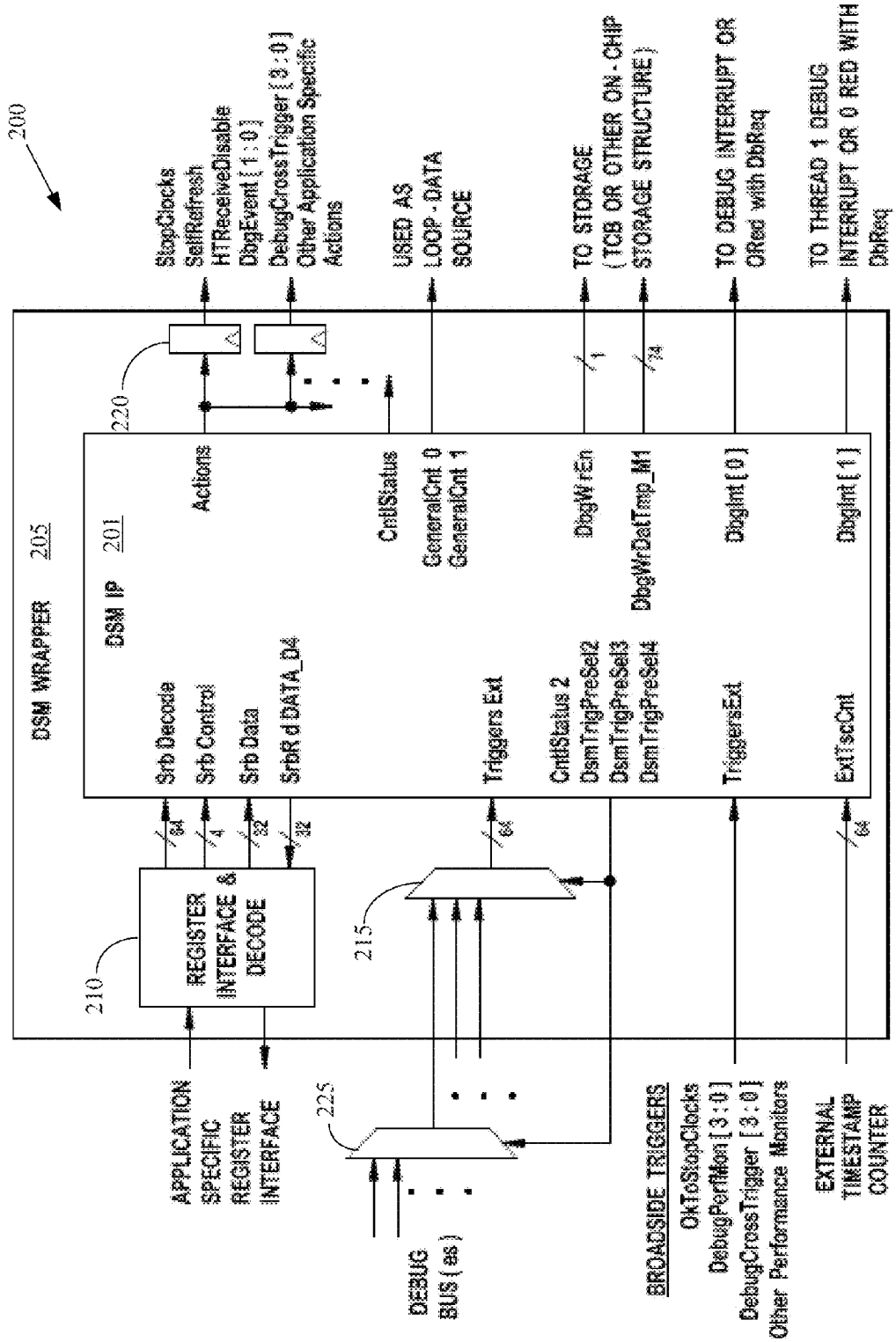
FIG. 2 conceptually illustrates one exemplary embodiment of an interface to a debugging state machine.

FIG. 2 conceptually illustrates one exemplary embodiment of an interface 200 to a debugging state machine 201. In the illustrated embodiment, the interface 200 may be used as the interface for debugging state machines such as the DSM 125 shown in FIG. 1. Embodiments of the interface 200 may have interfaces for clock signals, triggers, actions, special register bus (SRB) accesses, an external timestamp counter, control and status registers, debug interrupts, debug bus interfaces, general counters, control signals, etc. In the illustrated embodiment, portions of the interfaces may be implemented using a DSM wrapper 205 that may include a register interface and decoder 210, trigger multiplexers 215, flip-flops 220, or other functionality. Additional multiplexers 225 may also be used for multiplexing information received from a debug bus. Table 1 shows exemplary DSM interfaces that may be provided for the DSM. The DSM may have all or a subset of the interfaces listed in Table 1 depending on the application.

| Signal Name | I/O | Comments |
|---|---|---|
| | | CPL |
| CCLK | I | Global Clock |
| SC1 | I | Scan clock 1 |
| SC2 | I | Scan clock 2 |
| R | I | Reset |
| ScanShiftEn | I | Enable for scan shift mode |
| ClockGater | I | Clock gater input. |
| | | Triggers |
| TriggersExt | I | Triggers inbound to the DSM. |
| | | Actions |
| Actions | O | Actions outbound from the DSM. |
| | | SRB Access |
| RegDat | I | Write Data for DSM registers. |
| RegWrEnLo | I | Write signal for lower 32 bits. |
| RegWrEnHi | I | Write signal for upper 32 bits. |
| RegRdEn | I | Read select signal. 0: lower 32 bits, 1: upper 32 bits. |
| RegAccessGater | I | Flop gating for read return path flops. This signal is generated in the wrapper and is passed into the DSM for reducing CAC. |
| RegDecode | I | One-hot bus that is a decode for each DSM register access. The decoding is performed within the DSM wrapper such that each application can do its own debug. |
| RegRdData | O | Read-return data from the DSM. |
| | | External Timestamp Counter |
| ExtTscCnt | I | External timestamp counter input. The DSM may use its own internal timestamp counter or an external source. |
| | | Control and Status Registers |
| CntlStatus | O | Main control register for the DSM. |
| CntlStatus2 | O | Application specific control register for the DSM. |
| | | Miscellaneous Wrapper Control |
| DsmTrigPreSel2 | O | Additional application specific control register |
| DsmTrigPreSel3 | O | for the DSM. |
| DsmTrigPreSel4 | O | |
| | | Debug Interrupt(s) |
| DbgInt[0] | O | Debug interrupt signal. |
| DbgInt[1] | O | Debug interrupt signal. |
| | | Debug Bus Interface |
| DebugBusIn | I | Debug bus input port. |
| DebugTraceWrEn | O | |
| DebugTraceWrData | O | |
| | | General Counters |
| GeneralCnt0 | O | May be used as source data to place onto the |
| GeneralCnt1 | O | debug bus in a wrap-around mode to use for continuity testing. |

Embodiments of the processor-based system 100 shown in FIG. 1 may support scan capabilities so that the state of the processor arrays may be accessed by stopping clocks and scanning out information through the scan ports. The illustrated embodiment of the interface 200 may support this functionality by incorporating a separate set of pins (SC1 and SC2) for a scan clock. A trigger interface (TriggersExt) may be provided for inbound triggers to the DSM from the debug buses and broadside triggers. The broadside triggers include a signal to stop clock signals (OKToStopClocks), performance monitors, errors, breakpoints, cross-triggers from other DSM(s), etc. The actions interface (Actions) is for an outbound signal from the DSM for a specific action based on a trigger or a sequence of triggers. The SRB access interfaces (RegDat, RegWrEn, RegAccessGater, RegDecode, RegRd-Data) are provided for reading and writing data from and to the DSM registers. The DSM may use its own internal timestamp counter. Alternatively, the DSM may have an interface for an external timestamp counter input (ExtTscCnt) so that a global timestamp may be used across the DSMs. The control and status registers (CntlStatus, CntlStatus2, DsmTrigPreSel*) are for controlling the DSM. The debug interrupt interfaces (DbgInt) are for interrupting the microcode, etc., and may be ORed with the conventional debug request signal or may form a dedicated debug interrupt signal. The debug bus interfaces (DebugBusIn, DebugTraceWrEn, DebugTraceWrData) are for controlling and sending debug information to a storage unit, e.g., the DRAM 155 or storage units 160 shown in FIG. 1. Additional description of the DSM and related interfaces may be found in "DEBUG STATE MACHINE AND PROCESSOR INCLUDING THE SAME," Ser. No. 12/958,585 which was filed on Dec. 2, 2010 and which is hereby incorporated into the present application in its entirety by reference.

Figure 3:
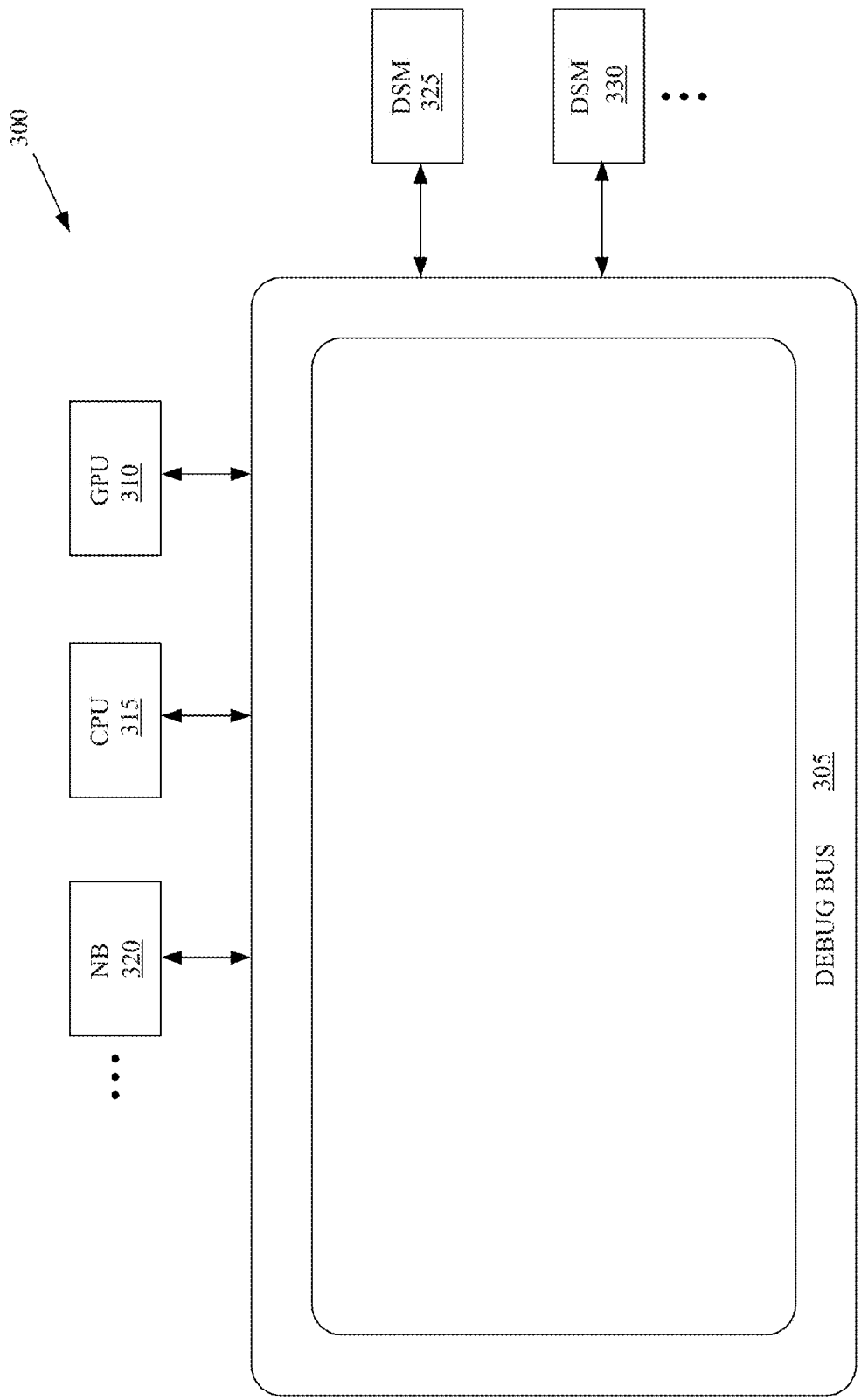
FIG. 3 conceptually illustrates a second exemplary embodiment of a processor-based system.

FIG. 3 conceptually illustrates a second exemplary embodiment of a processor-based system 300. The second exemplary embodiment of the processor-based system 300 may be implemented in combination with the first exemplary embodiment of the processor-based system 100 shown in FIG. 1. Alternatively, the second exemplary embodiment of the processor-based system 300 may be implemented independently or separately or as part of another device. In the illustrated embodiment, the processor-based system 300 includes a bus 305 that is used to convey signals related to debugging of the processor-based system 300. For example, the debug bus 305 may be a 32-bit bus that includes lines for carrying the 32 bits that are asserted onto the bus. The 32 bits may be divided into different subsets, e.g., four lines of the bus 305 may be used to carry bits indicating different commands and 28 lines of the bus 305 may be used to carry lines indicating an address. However, persons of ordinary skill in the art having benefit of the present disclosure should appreciate that alternative embodiments of the debug bus 305 may include different numbers of lines for carrying different numbers of bits that may be divided into different subsets. Moreover, alternative embodiments of the bus 305 may not be reserved for carrying signals exclusively associated with debugging and may alternatively be able to carry other types of signals.

In the illustrated embodiment, various entities within the processor-based system 300 may be physically, electromagnetically, or communicatively coupled to the bus 305. For example, a GPU 310, CPU 315, northbridge 320, and one or more debugging state machines (DSMs) 325, 330 may be physically, electromagnetically, or communicatively coupled to the bus 305 so that these entities can assert signals onto the bus 305 or receive signals that have been asserted onto the bus 305 by other devices. Persons of ordinary skill in the art having benefits of the present disclosure should also appreciate that in some embodiments the GPU 310, CPU 315, northbridge 320, or other entities coupled to the bus 305 may include DSMs that may assert signals onto the bus 305 or receive signals asserted onto the bus 305. Moreover, the DSMs 325, 330 may be implemented in other entities such as the GPU 310, CPU 315, or northbridge 320.

The DSMs 325, 330 can monitor signals on subsets of the lines of the bus 305 to detect debug triggers that may be used to generate signals for initiating debugging actions. In the illustrated embodiment, the DSMs 325, 330 are configured to monitor one subset of lines of the debug bus 305 to detect a trigger that causes the DSMs 325, 330 to capture values of bits asserted onto a different subset of the lines of debug bus 305. The captured values may then be used to define or modify a trigger for another debugging action.

Figure 4:
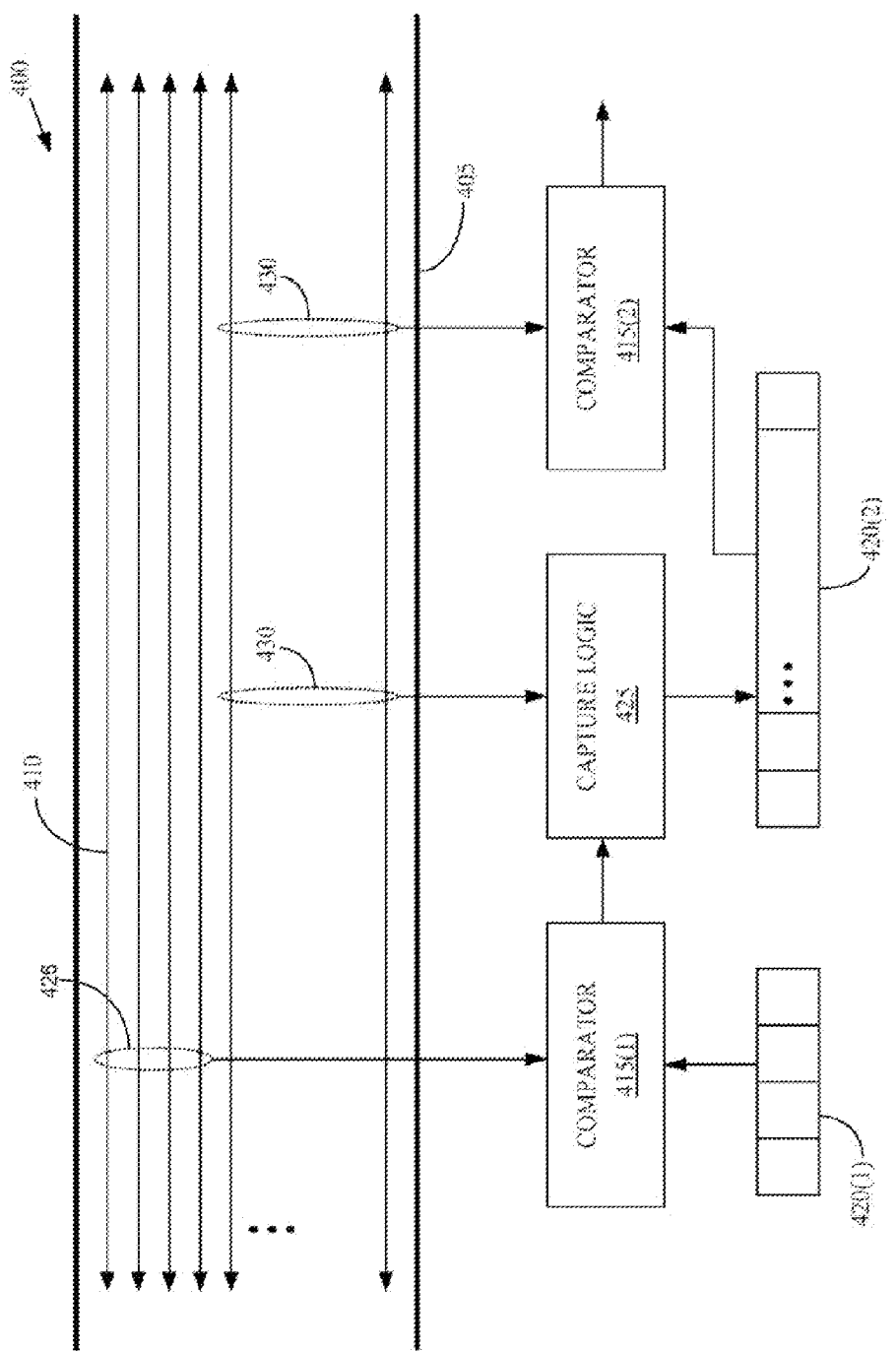
FIG. 4 conceptually illustrates a third exemplary embodiment of a processor-based system.

FIG. 4 conceptually illustrates a third exemplary embodiment of a processor-based system 400. In the illustrated embodiment, the processor-based system 400 includes a debug bus 405 that has a plurality of lines 410 (in the interest of clarity, only one line is indicated by a reference numeral). The processor-based system 400 also includes comparators 415 that can monitor subsets of the lines 410. Two comparators 415 are shown in FIG. 4 but persons of ordinary skill in the art having benefit of the present disclosure should appreciate that alternative embodiments of the processor-based system 400 may include any number of comparators 415. The comparators 415 may be configured to compare the values of bits asserted on the monitored subset of the lines 410 to trigger values, which may also be referred to as pattern match values. In the illustrated embodiment, the pattern match values may be stored in registers 420. However, in alternative embodiments, the pattern match values may be stored in memory, caches, flip-flops, or any other element in the processor-based system 400.

In the illustrated embodiment, the comparator 415(1) compares the values of the bits asserted on a subset 426 of the lines 410 to the values of the bits stored in the pattern match register 420(1). For example, the subset 426 may include four lines used to assert bits that represent commands and the values of the four bits stored in the pattern match register 420(1) may represent a particular command. When the values of the asserted bits match the values of the stored bits, indicating that the command asserted on the bus 405 matches the command identified by the bits in the pattern match register 420(1), the comparator 415(1) generates an action signal. In the illustrated embodiment, the action signal generated by the comparator 415(1) instructs capture logic 435 to capture values of bits asserted on another subset 430 of the lines 410. For example, the capture logic 435 may capture time-aligned values of address bits asserted on address lines of the bus 405 in response to the signal generated by the comparator 415(1). The capture logic 435 may then store the captured values of the bits in the pattern match register 420(2) for subsequent use by the comparator 415(2).

The comparator 415(2) may compare the values of the bits asserted on the subset 430 to the values of bits stored in the pattern match register 420(2). The bits stored in the pattern match register 420(2) may have predetermined values or they may represent values defined or modified by the capture logic 435, as discussed herein. For example, the subset 430 may include lines used to assert bits that represent addresses and the values of the bits stored in the pattern match register 420(2) may represent a particular address. When the values of the asserted bits match the values of the stored bits, indicating that the address asserted on the bus 405 matches the address identified by the bits in the pattern match register 420(2), the comparator 415(2) generates an action signal. In the illustrated embodiment, the action signal generated by the comparator 415(2) may be a debugging signal such as a signal to trigger stopping a clock, entering a debug mode, issuing a debug cross trigger, starting or stopping storage of information in a storage unit such as a register or memory, transitioning to or from a particular debug state, incrementing or clearing a counter, setting or clearing a flag in a register, or the like. Alternatively, the comparator 415(2) may issue an action signal that instructs capture logic 425 or other logic to capture values of bits asserted on another subset of the lines 410. Different embodiments of the system 400 including any number of comparators, registers, or capture logic may therefore be interconnected to form a dynamically evolving debug system in which combinations of triggers, captures, or delays may be used to create or modify triggers for other actions.

Figure 5:
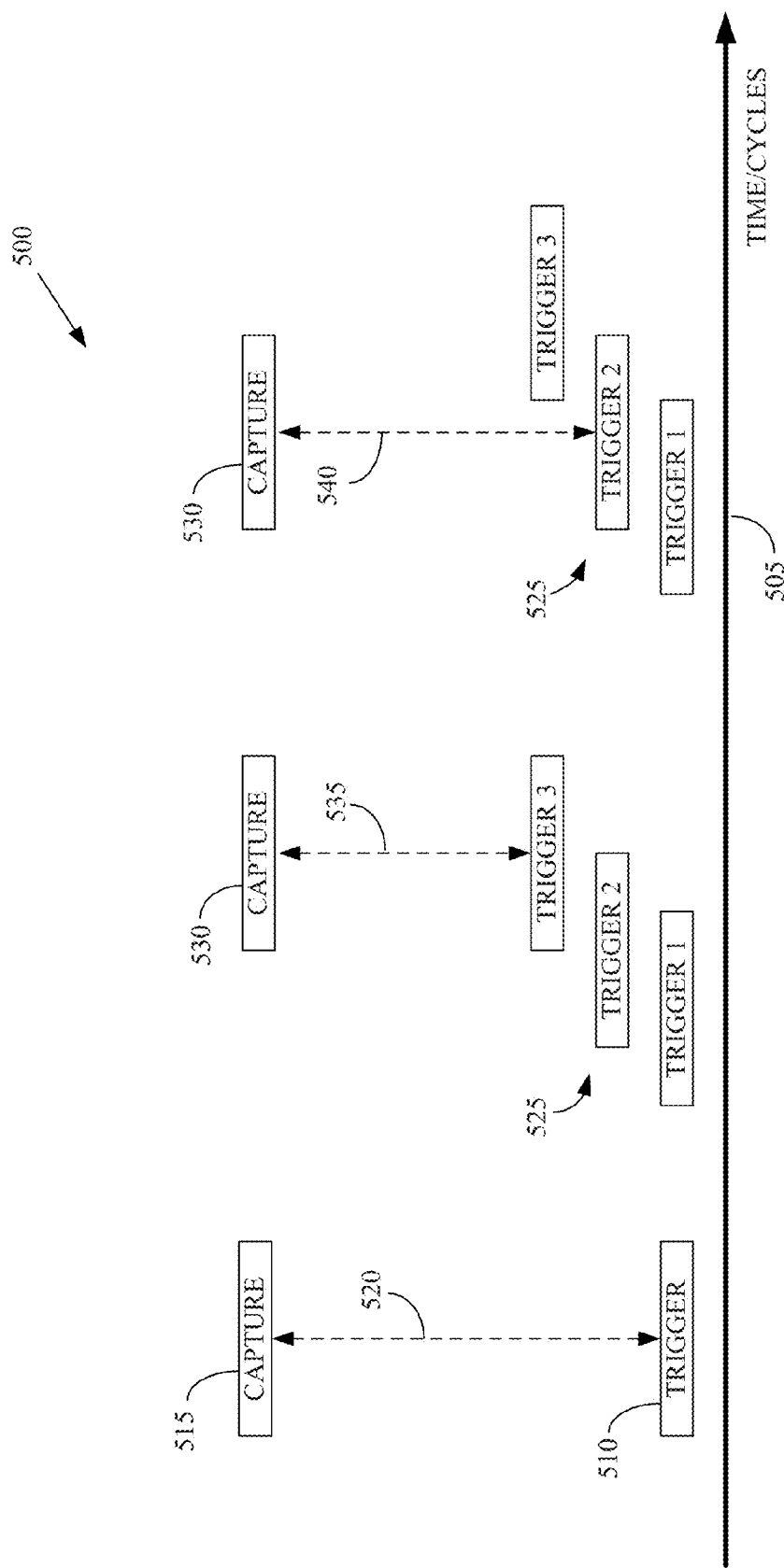
FIG. 5 conceptually illustrates one exemplary embodiment of a timing diagram that depicts exemplary time alignments of trigger and capture events in a processor-based system such as the systems shown in FIGS. 1, 3, and 4.

FIG. 5 conceptually illustrates one exemplary embodiment of a timing diagram 500 that depicts exemplary time alignment of trigger and capture events in a processor-based system such as the systems 100, 300, 400 shown in FIGS. 1, 3, and 4. In the illustrated embodiment, the horizontal axis 505 indicates time and increases from left to right. Increasing time may also be indicated in terms of cycles performed by the processor-based system. In the illustrated embodiment, trigger 510 may be used to initiate capture 515, as discussed herein. The trigger 510 and the capture 515 are time aligned, as indicated by the double headed arrow 520. Persons of ordinary skill in the art having benefit of the present disclosure should appreciate that differences in the length or circuitry in the circuit path traversed by the triggering signals and the capture signals may be compensated for using various delay elements. For example, the trigger 505 or the capture 510 may be delayed to account for differences in the data path and the trigger-to-action path. Delay elements may therefore be included in the comparators, capture logic, or elsewhere within the processor-based system.

Multiple triggers 525 may be combined to initiate one or more captures 530. In the illustrated embodiment, the capture 530 may be initiated in response to the combination of three triggers 525. The capture 530 may be time aligned with the third trigger 525, as indicated by the double headed arrow 535. Alternatively, the capture 530 may be time aligned with a different trigger 525 such as the second trigger 525, as indicated by the double headed arrow 540. Persons of ordinary skill in the art having benefit of the present disclosure should appreciate that the trigger/capture sequences depicted in FIG. 5 are intended to be illustrative. Alternative embodiments of the trigger/capture sequences may use different numbers of triggering events or capture events, as well as different time alignments between the triggering or capture events.

Figure 6:
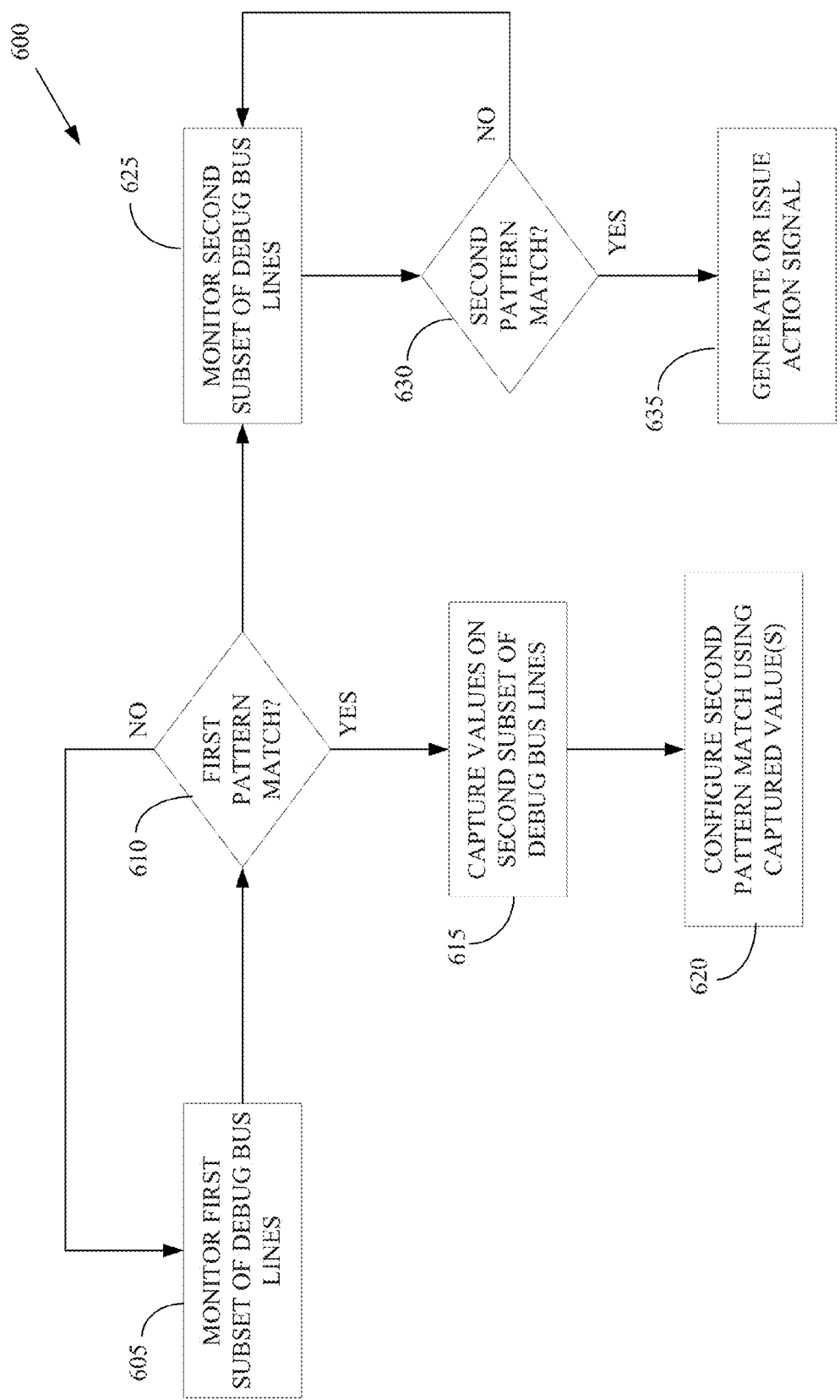
FIG. 6 conceptually illustrates one exemplary embodiment of a method or dynamically modifying pattern matches for debugging actions.

FIG. 6 conceptually illustrates one exemplary embodiment of a method 600 for dynamically modifying pattern matches for debugging actions. In the illustrated embodiment, a first subset of the lines of a debug bus is monitored (at 605). The monitoring (at 605) may continue until the values asserted on the first subset of the lines matches (at 610) a first pattern of bits. Once the matching pattern of bits is detected (at 610) on the subset of lines, values of the bits asserted on a second subset of the lines of the bus may be captured (at 615). The captured values may then be stored or used to configure (at 620) pattern matching values that can be used to trigger other debugging actions or capture other values on other subsets of lines of the bus. For example, the captured values may be stored as a second pattern that can be compared to values asserted on the second subset of lines. Monitoring (at 605) of the first subset of the lines may then continue.

The second subset of the lines may be monitored (at 625) concurrently with monitoring (at 605) the first subset of lines. Monitoring (at 625) of the second subset may be used to detect a second pattern of the bits asserted on the second subset. The second pattern may be represented by predetermined values of bits or bit values that have been defined or modified (at 620) based on values captured (at 615) from the second subset of lines of the bus in response to the pattern of values asserted on the first subset of lines matching (at 610) the first pattern. Monitoring (at 625) of the second subset continues until values asserted on the second subset of lines matches (at 630) the second pattern. A signal representing an action may be generated or transmitted (at 635) in response to the asserted values on the second subset of lines matching (at 630) the second pattern. As discussed herein, the signal may be used to trigger debugging actions or capture/configuration of other triggering values.

Embodiments of the techniques described herein may be used to dynamically monitor in-flight transactions. In one embodiment, transactions between a requesting entity and an accessing entity can be monitored on the basis of the transaction address or a transaction identifier. For example, different requests for I/O access control may attempt to access the same memory address. Address bits representing the address may therefore be captured when the command bits on the bus indicate that the address bits are associated with a request for I/O access control for the memory address. The captured address bits may then be used to define pattern matching values and the debugging state machine may use these pattern matching values to detect subsequent attempts to gain I/O access control for the same memory address. The debugging state machine may stop monitoring the address or reset the address in the pattern matching value when access control has been released or the in-flight transaction has completed. The debugging state machine may therefore be able to prevent accesses that could corrupt any in-flight accesses to the same memory address.

Embodiments of the techniques described herein may also be used to enforce compliance with security or access rules such as MUTEX rules. For example, one MUTEX rule may control access to a data/address register pair. The rule states that it is illegal for one processor core to access the data register in the pair before another processor core that previously wrote to the address register in the pair has completed its transaction by accessing the data register in the pair. An address or transaction identifier associated with the data/address register pair for the transaction may therefore be captured from a bus in response to the debugging state machine detecting a write command to the address register in the pair by first processor core. The captured address or transaction identifier may then be used to configure a trigger for an action that only allows a second processor core to access the address/register pair when the debugging state machine determines that the first processor core has finished the transaction associated with the captured address or transaction identifier.

Embodiments of the techniques described herein may further be used to implement store-on-change functionality for storing valid trace data. For example, system resources may be conserved by storing trace data only when the trace data has changed from a previous value. However, the data may be associated with a valid bit that indicates whether the data is valid. Invalid data may take on arbitrary values that do not need to be stored even though they may be different than the previously stored value of the trace data. A conventional store-on-change operation compares the present cycle's data to the previous cycle's data regardless of any valid bits. This can help filter the quantity of data stored in debug traces when the data is not changing every cycle. In one embodiment, a timestamp may also be stored with the data so the exact sequence of events can be reconstructed at a later time.

Embodiments of the dynamic match value updating technique described herein may apply store-on-change to cases in which consecutive cycles are not necessarily compared to each other because the valid bit may invalidate data for one or more of the cycles. Embodiments of the DSM may therefore be programmed so that trace data is stored when the valid bit indicates valid data and the current cycle data does not match the previously stored data. The match value for the store-on-change is also updated so that the debugging state machine can compare the stored value to values asserted on the bus in subsequent cycles. However, if the valid bit indicates invalid data, the debugging state machine does not store the trace data even if the data has changed from the previous cycle. The debugging state machine also does not update the matching value if the valid bit indicates invalid data. When embodiments of this dynamic updating technique are applied on a per-cycle basis, the comparison between the match value and the data may evolve over time to store the trace cache when the valid data of the current cycle does not match the previously stored valid data, regardless of the number of cycles between the current cycle and the cycle during which the previous valid data was stored.

Embodiments of processor systems that implement embodiments of the on-should debugging techniques as described herein (such as the processor systems 100, 300, 400) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
comparing values of bits received on a first subset of a plurality of lines of a bus with a first pattern of bits;
during a time interval that is aligned with a time interval during which the values of the bits received on the first subset of the lines match the first pattern, capturing values of bits received on a second subset of the plurality of lines of the bus in response to the comparison indicating that the values of the bits received on the first subset of the lines match the first pattern of bits; and
defining a second pattern of bits for triggering a debug action using the captured values.

2. The method of claim 1, wherein comparing the values received on the first subset of the lines with the first pattern comprises comparing a first subset of bits received on command lines of the bus with a first pattern indicating a predetermined command.

3. The method of claim 2, wherein capturing the values of the bits received on the second subset of the lines comprises capturing values of bits received on address lines of the bus.

4. The method of claim 1, wherein the first subset of the lines and the second subset of the lines are mutually exclusive subsets of the lines of the bus.

5. The method of claim 1, wherein capturing the values of the bits received on the second subset of the lines comprises capturing the values of the bits received on the second subset of lines in response to a trigger generated in response to determining that the values of the bits received on the first subset of the lines match the first pattern.

6. The method of claim 1, comprising comparing values of bits received on at least one third subset of the lines of the bus with at least one third pattern of bits.

7. The method of claim 6, comprising capturing the values of the bits received on the second subset of the lines in response to the comparison indicating that the values of the bits received on said at least one third subset of the lines match said at least one third pattern of bits.

8. The method of claim 7, wherein capturing the values of the bits received on the second subset of lines comprises capturing the values of the bits received on the second subset of lines during a time interval that is aligned with at least one of the time interval during which the values of the bits received on the first subset of the lines match the first pattern or at least one time interval during which the values of the bits received on said at least one third subset of the lines match said at least one third pattern.

9. The method of claim 1, comprising triggering the debug action when values of bits received on the second subset of lines match the second pattern of bits.

10. An apparatus, comprising:
a first comparator configurable to compare values of bits received on a first subset of a plurality of lines of a bus with a first pattern of bits;
logic configurable to capture values of bits received on a second subset of the plurality of lines of the bus in response to a signal from the first comparator indicating that the values of the bits received on the first subset of the lines match the first pattern of bits and during a time interval that is aligned with a time interval during which the values of the bits received on he first subset of the lines match the first pattern; and
wherein the logic is further configurable to define a second pattern of bits for triggering a debug action using the captured values.

11. The apparatus of claim 10, wherein the first comparator is configurable to generate the signal in response to determining that the values of the bits received on the first subset of the lines match the first pattern of bits.

12. The apparatus of claim 10, wherein:
the first subset of the plurality of lines comprises command lines of the bus; and
the first pattern indicates a predetermined command.

13. The apparatus of claim 12, wherein the logic is configurable to capture values of bits received on address lines of the bus in response to the first subset of bits received on the command lines matching the first pattern indicating the predetermined command.

14. The apparatus of claim 10, wherein the first subset of the lines and the second subset of the lines are mutually exclusive subsets of the lines of the bus.

15. The apparatus of claim 10, comprising a second comparator configurable to generate a signal for triggering the debug action when values of bits received on the second subset of lines match the captured values of the bits received on the second subset of lines.

16. The apparatus of claim 15, comprising at least one third comparator configurable to compare values of bits received on at least one third subset of the lines of the bus with at least one third pattern of bits.

17. The apparatus of claim 16, wherein the logic is configurable to capture the values of the bits received on the second subset of the lines in response to at least one signal from said at least one third comparator indicating that the values of the bits received on said at least one third subset of the lines match said at least one third pattern of bits.

18. The apparatus of claim 17, wherein the logic is configurable to capture the values of the bits received on the second subset of lines during a time interval that is aligned with at least one of the time interval during which the values of the bits received on the first subset of the lines match the first pattern or at least one time interval during which the values of the bits received on said at least one third subset of the lines match said at least one third pattern.

19. The apparatus of claim 10, wherein the logic is configurable to trigger the debug action when values of bits received on the second subset of lines match the second pattern of bits.

20. An apparatus, comprising:
a first comparator configurable to compare values of bits received on a first subset of a plurality of lines of a bus with a first pattern of bits;
logic configurable to capture values of bits received on a second subset of the plurality of lines of the bus in response to a signal from the first comparator indicating that the values of the bits received on the first subset of the lines match the first pattern of bits, the second subset of the plurality of lines comprising address lines of the bus; and
wherein the logic is further configurable to define a second pattern of bits for triggering a debug action using the captured values.

21. The apparatus of claim 20, wherein:
the first subset of the plurality of lines comprise command lines of the bus; and
the first pattern of bits represents a predefined command.

22. The apparatus of claim 20, wherein the logic is configurable to trigger the debug action when values of bits received on the second subset of lines match the second pattern of bits.

* * * * *